Sept. 16, 1924.  1,508,738

M. A. WHITING

METHOD OF AND APPARATUS FOR AUTOMATIC ARC WELDING

Filed Feb. 15, 1919   3 Sheets—Sheet 1

Inventor:
Max A. Whiting.
by Albert S. Davis
His Attorney

Sept. 16, 1924.

M. A. WHITING 1,508,738

METHOD OF AND APPARATUS FOR AUTOMATIC ARC WELDING

Filed Feb. 15, 1919    3 Sheets-Sheet 2

Inventor:
Max A Whiting,
by *[signature]*
His Attorney.

Sept. 16, 1924.

M. A. WHITING 1,508,738

METHOD OF AND APPARATUS FOR AUTOMATIC ARC WELDING

Filed Feb. 15, 1919     3 Sheets—Sheet 3

Inventor:
Max A. Whiting,
by Albert G. Davis
His Attorney.

Patented Sept. 16, 1924.

1,508,738

UNITED STATES PATENT OFFICE.

MAX A. WHITING, OF SCHENECTADY, NEW YORK, ASSIGNOR TO GENERAL ELECTRIC COMPANY, A CORPORATION OF NEW YORK.

METHOD OF AND APPARATUS FOR AUTOMATIC ARC WELDING.

Application filed February 15, 1919. Serial No. 277,309.

*To all whom it may concern:*

Be it known that I, MAX A. WHITING, a citizen of the United States, residing at Schenectady, in the county of Schenectady, State of New York, have invented certain new and useful Improvements in Methods of and Apparatus for Automatic Arc Welding, of which the following is a specification.

The present invention relates to arc welding and is particularly applicable to welding by a metallic electrode, and is especially adapted for welding machines in which an arc is drawn between an electrode and an article to be welded and is caused to travel over the work.

An object of my invention is to provide an automatic arc welding apparatus which shall be sensitive in operation and which shall reduce the number of moving parts to a minimum.

A further object of my invention is to provide means operating in accordance with the potential across the arc to feed a welding electrode toward and away from the work to draw or strike the welding arc, whereby the starting and continuous operation of the apparatus is facilitated and insured.

A further object of my invention is to provide a welding apparatus in which a reversible electric motor controlled by an electrical condition of the welding current is arranged both to strike and to regulate the arc to maintain the same at a predetermined length.

A further object of my invention is to provide an arc welding apparatus in which the electrode feed is automatically controlled in response to the resultant effect of the arc potential and an independent source of potential. More specifically, one object of my invention is to provide a method and apparatus whereby arc welding electrodes are caused to approach and recede from each other in accordance with a variation or departure of potential of the welding arc from a predetermined value, which differs from the desired arc potential, preferably being less than the arc potential, and at a rate corresponding substantially to the magnitude of this variation.

A further object of my invention is to provide means for automatically controlling the motion of traverse of the arc relatively to the work in accordance with the electrical condition of the welding arc, starting the traversing motion when the welding arc is established and stopping this motion when the arc is short circuited or interrupted.

A further object of my invention is to provide a method of and apparatus for striking or drawing the welding arc which reduces to a minimum the liability of the electrodes to stick or weld together.

My invention will be better understood from the following description taken in connection with the accompanying drawings and its scope will be pointed out in the appended claims.

My invention is particularly adapted for arc welding operations involving the traverse of a welding arc linearly over the work along a seam although it is not limited in its utility to this class of welding operations.

Figure 1:
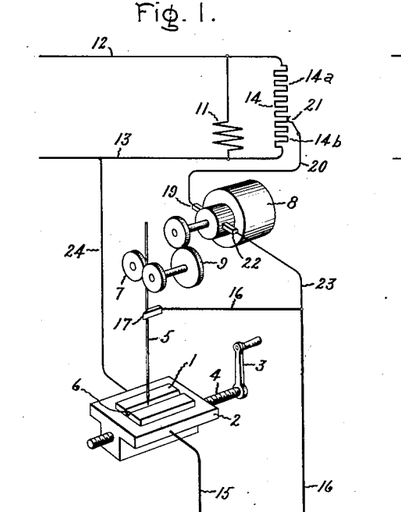
Fig. 1 of the drawings illustrates diagrammatically an embodiment of my invention in one of its simplest forms.

In Fig. 1 is illustrated a simple device whereby the work 1, supported on a platform or base 2, may be moved in any suitable way, for example, by means of a hand operated crank 3, connected to a lead screw 4 to traverse the welding arc operating between the work and a fusible electrode 5 along a linear junction 6 between the two parts of the work to be welded. The electrode 5 is gripped by feed rollers 7 and moved toward or away from the work by a direct current electric motor 8 connected to the feed rollers through the speed-reducing gears 9. The electrode 5 may consist of any desired welding material, such as iron, and may be of various cross-sections, depending on the welding current, the character of the weld to be made, and other conditions. A suitable mounting for the motor and the welding head will be described hereinafter in connection with Fig. 6.

The feed motor 8 has a field winding 11 energized by a current which may be of substantially constant value derived from any convenient source, for example, constant potential mains 12, 13. The feed motor 8 is connected to feed the electrode 5 in accordance with the departure of the potential of the welding arc from a predetermined substantially fixed potential. This substantially fixed potential may be obtained at any required magnitude by connecting a resistor 14 to a constant potential unidirectional source, in this case conveniently the mains 12 and 13, and making an electrical connection to an intermediate point on resistor 14, for example, by adjustable contact 21. The electrode 5 and the work 1 are supplied with suitable unidirectional welding current conveyed by the conductors 15 and 16, current being conveyed to the electrode 5 by a brush 17. One brush 19 of the motor is connected by the conductor 20 to the above described point 21 of intermediate potential on the resistor 14, the opposite motor brush 22 being connected by the conductors 23 and 16 through the contact brush 17 to the electrode 5.

The intermediate point 21 should be so chosen that the drop in potential between the point 21 and the conductor 13, while regulating the arc, as later described, is less than the desired arc potential by a magnitude sufficient to operate the feed motor 8 at a speed which will advance the electrode 5 fast enough to maintain the arc at a desired arc potential, and in normal operation. This intermediate point should, however, be so chosen that when electrode 5 is in contact with the work 1, the motor 8, which is then substantially in multiple with resistor section $14_b$ (except for the contact resistance between the electrodes) will be sufficiently energized to cause it to revolve in the reverse direction, as will appear later. For example, if it is desired to weld at an arc potential of substantially 15 volts, the feed motor 8 and the feeding mechanism may be so designed that they will operate at the required average rate of feed with an average of five volts impressed across the armature of feed motor 8, then the values of the sections $14_a$ and $14_b$ of the resistor 14 should be so chosen with respect to each other and the feed motor armature current that the potential drop across $14_b$ under this condition is substantially 10 volts. In order to secure close response of the rate of feed of electrode to fluctuations in arc potential, I prefer to use, as the feed motor designated by the numeral 8 in the various figures, a motor having relatively a very low peripheral speed and therefore having relatively a very low stored energy in its armature at the speeds at which it operates while regulating the welding arc. The motor 8 preferably should have, additionally a relatively low resistance of armature and brushes so that the potential lost therein is a minimum under regulating conditions. The reduction of its stored energy reduces the delay of the feed motor 8 in responding to the changes of arc potential. The reduction of its armature circuit resistance increases the responsiveness of the armature current to the momentary fluctuations of potential impressed on the feed motor by the fluctuations of the arc potential, that is, still further reduces the delay of the armature current in responding to the changes in arc potential.

Variations in current taken by the feed motor 8 will affect the magnitude of current flowing in the resistor section $14_b$, hence, for any one adjustment of the section $14_b$, will affect the potential drop across section $14_b$. In order to maintain the potential drop across $14_b$ at a substantially fixed value while regulating the arc, regardless of fluctuations of feed motor current incident to its work of regulating the electrode feed, the resistor 14 should preferably be so proportioned that the total current flowing in resistor section $14_b$ is considerably greater than the current required by the motor 8 for driving the feed rollers during welding.

Typically the work 1 is of positive polarity, which is the polarity assumed in the following explanation. The conductor 15 will then be the positive member and the conductor 16 the negative member of the welding source 15—16. The conductor 12 will be the negative member of the constant potential source 13—12.

Before beginning the welding operation, the electrode 5 may be placed in contact with the work so that, when the system is energized the potential drop between electrode 5 and the work is limited substantially to the contact resistance typically about one and one-half volts. The motor 8 will then be energized by a current from the main 13, passing through the conductor 24, the welding electrodes, the conductors 16 and 23, entering motor armature at the brush 22, emerging through the brush 19, and passing through the conductor 20 and the resistor section $14_a$ to the negative main 12. The motor 8 and mechanism are so arranged that this direction of current in motor 8 will cause rotation in the direction to back the electrode away from the work. As the electrode 5 is backed away from the work the welding arc is established, fusing the tip of the electrode 5.

When the arc potential becomes approximately 10 volts the motor will discontinue its reverse rotation. As the electrode continues to fuse and the arc to lengthen, the potential drop across the arc will become greater than 10 volts. When, for example, the arc potential attains a value of 15 volts, the potential difference between point 21 and the electrode brush 17 (between which the motor armature is connected) will be approximately 5 volts. The current then enters the motor armature at the brush 19 and emerges at the brush 22, which causes rotation in the direction to feed the electrode toward the work. If, as assumed above, the motor will feed the electrode at the required rate with an impressed potential of five volts the arc potential will be maintained at the desired value of fifteen volts.

It is an advantage of my invention in its various embodiments, when suitably designed and adjusted, that a small variation of arc potential from the desired value causes a proportionally much larger variation in the rate of feed of the welding electrode. This may be understood from the following example: In Fig. 1, let the feed motor 8 and the feed mechanism be so designed that the motor 8 while regulating the feed has a resistance drop in armature, brushes and leads of substantially 1 volt. Let point 21 be maintained at a potential difference of substantially 10 volts from the work 1. Let the desired arc potential be 15 volts. The counter E. M. F. of motor 8, at normal rate of feed of elctrode, will then be 4 volts. If the arc potential now decreases 1 volt, (a decrease of 6⅔%) the counter E. M. F. or motor 8 will be decreased 1 volt, (a decrease of 25%) and the rate of feed of the welding electrode will therefore decrease 25%. Similarly, if the arc potential increases 1 volt, this increase of 6⅔% in arc potential causes an increase of 25% in the counter E. M. F. of the motor 8 and therefore in the rate of feed of the welding electrode. By thus providing that a relatively small deviation from normal causes a relatively large change in the rate of feed of the electrode, the apparatus is able to regulate the arc potential closely to the desired potential.

During the operation of the arc, the welding electrode 5 may be caused to be traversed along the seam to be welded by moving either the electrode or the work linearly. As shown in the drawing, for the purpose of illustration, the work may be traversed by turning the crank 3. Should the electrode in its travel across the work encounter an irregularity, for example, a hump, causing the welding arc to be shortened, the potential difference between point 21 and electrode 5 will decrease, and hence the feed motor 8 will be retarded, thus ordinarily enabling the welding arc to traverse the hump without short-circuiting. Similarly after the arc crosses the peak of the hump and begins to traverse down the opposite side of the hump, when the arc length increases the increased potential difference between point 21 and the electrode 5 will accelerate the feed motor 8 and restore normal arc length. In the same manner differences in arc length due to other causes are compensated by differences of speed of the motor 8 so as to maintain the arc at all times substantially at the desired arc potential.

If the arc becomes short-circuited by any cause while welding the unbalance of the various potentials assumes substantially the same relation as when electrode 5 initially comes into contact with the work. The feed motor therefore reverses to the backing-out direction and ordinarily separates the two electrodes, thereby restriking the arc.

In case the open-circuit potential of the welding current supply mains is not too high, typically not exceeding approximately 60 volts, the electrode 5 may not be initially in electrical contact with the work. In that case the open-circuit potential of the current in the welding circuit 15, 16, will be opposed to and will predominate over the potential across the resistor section $14_b$. The motor 8 will be energized by a current having a potential equal to the difference of these two values in a direction to feed the electrode rapidly forward into contact with the work. When contact is made the potential between the electrode 5 and the work 1 falls substantially to zero, causing the motor to be reversed to back the electrode 5 away from the work to strike the arc. As the arc lengthens and its potential drop becomes greater than the potential drop across the resistor $14_b$, the motor reverses and feeds the electrode to maintain the arc, as already described above.

Figure 2:
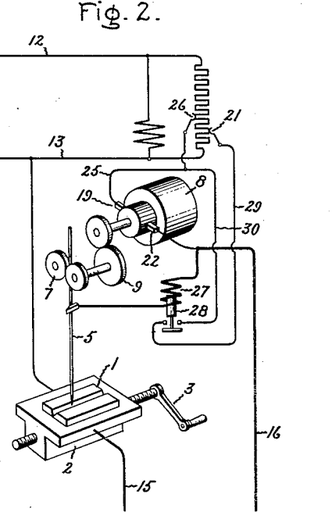
Fig. 2 illustrates a slightly modified system.

In the system illustrated, in Fig. 2, means is provided whereby when using a welding source of relatively high open-circuit potential, typically 125 or 250 volts, and when commencing operations with electrode 5 initially out of contact with the work, the motor 8 is protected from a potential so high as to cause an excessive speed at the beginning of the operation before the electrode 5 has come into contact with the work 1, to strike the arc. Initially the brush 19 of the motor is connected by the conductor 25 to a point 26 on the resistor, which is farther removed from the conductor 13 than the point 21, and which therefore has a greater potential difference with respect to to conductor 13. By this means the potential difference between point 26 and conductor 16 may be reduced to a value sufficiently low to limit the speed of the motor 8 to a suitable value. When the electrodes 5 and 1 have made contact, the winding of the contactor 27 is energized, which, by pulling up its armature 28, short-circuits the resistor section between the points 21 and 26 through the conductors 29 and 30. Resistor sections 13—21 and 26—12, remain in circuit and henceforth perform the same functions as resistor sections 14$_b$ and 14$_a$ respectively, in Fig. 1. The arc is now struck and regulated in the same manner as described in connection with Fig. 1.

Figure 3:
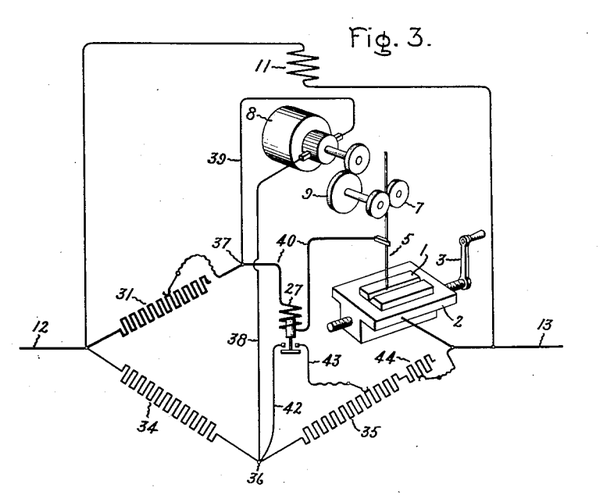
Fig. 3 shows another modification in which the welding arc is connected with certain resistors in a circuit arrangement resembling a Wheatstone bridge.

In the embodiment of my invention shown in Fig. 3, a specific source of welding current is shown comprising constant potential supply mains 12, 13, and a resistor 31 connected in series with the welding electrodes. Connected between the mains 12, 13, are resistors 34, 35 and 44, respectively, corresponding in function to resistors 26—12, 21—26, and 13—21, in Fig. 2. The resistor 31, the arc, the resistor 34, and the group consisting of resistors 35 and 44, are related to constitute a Wheatstone bridge which is unbalanced in one direction while the electrode 5 is initially approaching the work, is unbalanced in the opposite direction while electrode 5 is in contact with or backing away from the work, and is unbalanced again in the original direction but with a changed adjustment when the welding arc is normally operating. The feed motor 8 is connected across the arms of the bridge between the points 36, 37, by the conductors 38, 39.

The operation of the apparatus illustrated by Fig. 3, is similar to the operation of the apparatus shown in Fig. 2. For purposes of explanation assume, as hereinbefore, that the work 1 is of positive polarity. Assuming the electrodes to be out of contact at the beginning of the operation, the bridge is completely unbalanced so that current flows from the point 36 to the point 37. This direction of current in motor 8 will cause the electrode 5 to approach the work. When the electrode 5 and the work come into contact and the potential drop in the arm of the bridge containing these electrodes decreases to substantially zero, the bridge becomes unbalanced in the opposite direction and therefore reverses the current in the motor circuit 38, 39. The motor consequently reverses to separate the electrodes and strike the arc. Current flow in the arc circuit energizes the contactor 27 connected in series with the arc, and the resistor 35 is short-circuited through the conductors 42, 43, thereby reducing the potential drop across this arm of the bridge.

After the arc is formed and the electrode 5 begins to fuse, the potential drop across the arc increases until it is greater than the potential drop across the resistance remaining in the opposed arm of the bridge, that is, the resistor section 44 between the conductors 43 and 13. The electrode feed motor 8 will reverse again, that is, will run in its original direction to feed the electrode 5 toward the work at a rate depending substantially on the magnitude of the difference between the arc potential and the potential drop in the resistor 44, hence feeding the electrode 5 toward the work to maintain the welding arc substantially at a predetermined arc potential which has been found suitable for the class of work being welded.

Figure 4:
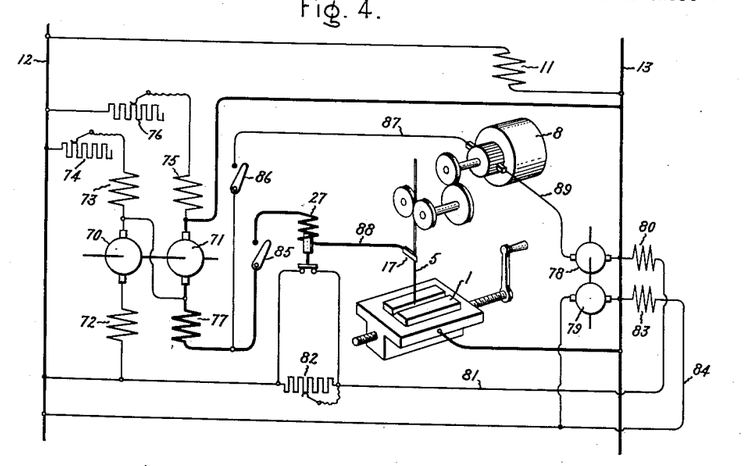
Fig. 4 shows a modification in which primary sources of electromotive force are used in an embodiment of my invention in place of resistances.
Figure 5:
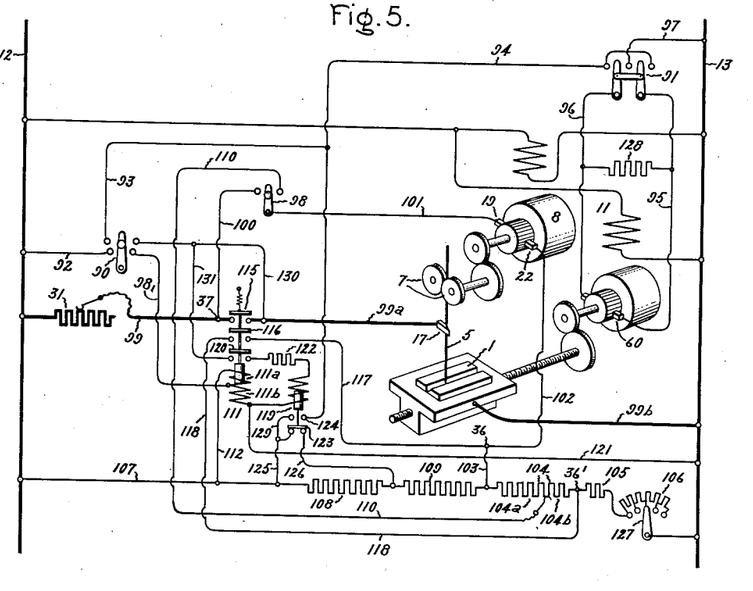
Fig. 5 illustrates a more highly developed embodiment of my invention containing various automatic features.
Figure 6:
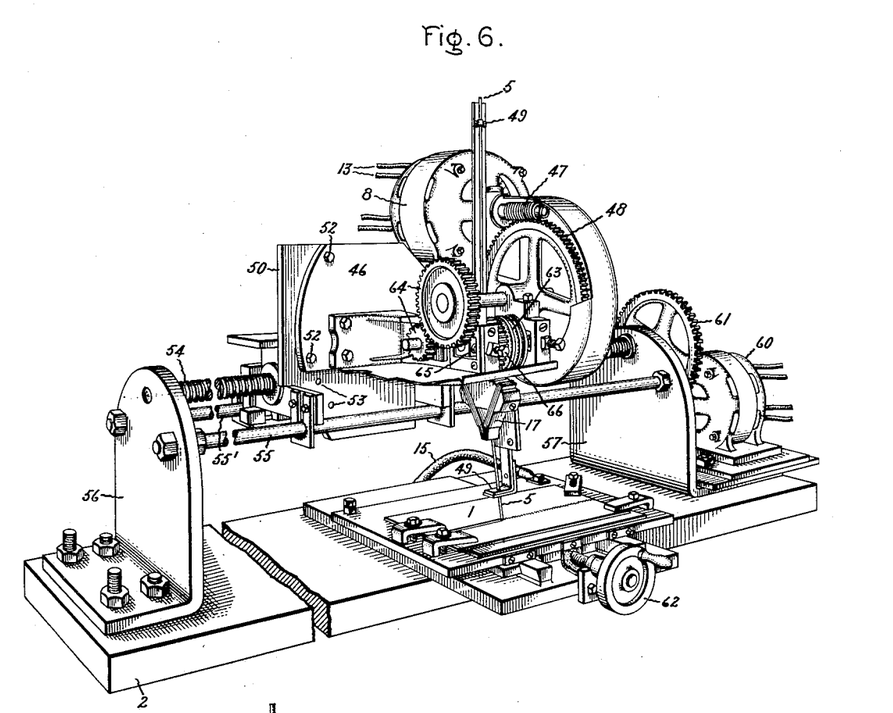
Fig. 6 illustrates in perspective a mechanical embodiment of an apparatus operable in accordance with my invention.

Before proceeding to a description of Figs. 4 and 5, attention is directed to Fig. 6, which shows in perspective a specific mounting and gear arrangement for the welding electrodes, motors, and accessory parts. In this figure the work has been shown as stationary, the welding head being traversed, whereas in other figures the welding head is assumed to be stationary and the work is traversed, the result in each case being traverse of the welding arc over the work.

Figure 7:
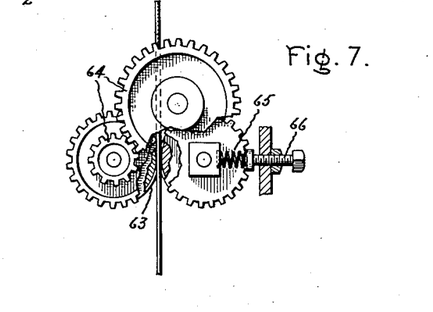
Fig. 7 illustrates a detail of the electrode feed mechanism.

The welding head comprises base 46 and all members mounted thereon to rotate therewith, as explained immediately following, including principally the feed motor 8, the worm 47, and the worm gear 48, the electrode guides 49, the brushes 17, and the feed devices shown in Fig. 7. This welding head is supported on the traversible table 50. In order that the electrode 5 may approach the work at any desired angle in the plane of its own traverse the welding head may be rotated about a pivot (not shown) so as to adjust electrode 5 to various inclinations in the vertical plane in which it is traversed, and may be held in the desired position against the table 50 by bolts 52 registering with the appropriate holes of a series provided in the plate 50, two of which are visible at 53.

The table 50 is mounted on a lead screw 54 and guide rods 55, 55'. The rods 55, 55' are rigidly attached to the brackets 56, 57, which are in turn bolted to the base 2 which is composed, in part at least, of nonconducting material. The lead screw 54 engages with a threaded bushing attached to the table 50, makes a bearing fit in the brackets 56, 57, and is rotated by a motor 60 through speed reducing gearing 61. By means of the foregoing construction the welding head, tilted to any desired angle may be traversed relatively to the work.

After the work 1 has been lined up so that the joint to be welded is substantially parallel with the direction of traverse of the arc, lateral deviations of the joint from the path of the arc may be corrected while welding by means of a handwheel 62. The electrode 5 passes between frictionally engaging rollers 63, a side view of which is presented in Fig. 7. Rollers 63 may have a plurality of grooves for engaging respectively with various sizes of electrodes. The brushes 17 convey welding current to the electrode 5 through a suitable conductor (not shown). The worm 47 on the motor shaft engages with the worm gear 48 and suitable gears, such as spur gears 64, for which various pairs may be substituted as desired to increase or decrease the total speed reduction through which the feed motor 8 rotates the rollers 63, as shown in Fig. 7. The pressure of engagement of the rollers 63 with the electrode 5 may be varied by adjusting the tension of springs 65 by their respective screws 66, as shown in Figs. 6 and 7.

Fig. 4 shows two principal modifications which may be employed in combination, as shown, or may be substituted severally, as desired, in Figs. 1, 2, 3, and 5. One of these principal modifications shown in Fig. 4 consists of a specific source of welding current applicable to Figures 1 and 2, and capable of substitution in place of resistor 31 in Fig. 3 and Fig. 5. The other principal modification consists of the use of a prime source of potential, typically a small generator, which may be substituted for the system of resistors 13—21, 21—26, 26—12 in Fig. 2, or correspondingly in Figs. 1 or 3, in order to establish a substantially fixed potential the difference between which and the arc potential is applied to the feed motor 8.

In the modified welding system illustrated in Fig. 4, a current from the constant potential mains 12, 13, is modified for welding purposes by a balancer set comprising a motor 70 and a generator 71, the motor having a series field winding 72, and a shunt field winding 73 connected in series with a resistor 74, and wound accumulatively with respect to the winding 72. The generator 71 has a separately excited field winding 75 connected in series with an adjustable resistor 76 across the constant potential mains 12, 13, and has an opposing field winding 77 connected in series with the welding arc. The balancer set here shown is described and claimed in Patent No. 1,310,131, granted July 15, 1919, to Paul O. Noble.

The generator 78, driven by the motor 79, constitutes a source of potential substantially constant at either of two preadjusted values and caused to assume either potential in the manner described hereinafter. The generator 78 has a separately excited field winding 80 connected at one terminal to the main 13, and at the opposite terminal to the main 12 by the conductor 81 in series with a non-inductive resistor 82. The motor 79 and its field winding 83 are connected at one terminal to the main 13, and at the opposite terminal, to the main 12 by a conductor 84.

In the described system the automatic operation may be started either with the electrodes in contact or out of contact. With the welding electrode 5 initially out of contact with the work, the balancer 70, 71, and motor-generator 78, 79, revolving at normal speed, the potential drop across the electrodes exceeds the potential drop across the generator 78 by a difference which, when applied to the feed motor 8 will not cause a detrimentally high speed before electrode 5 comes initially into contact with the work. To commence operation the switches 85 and 86 are closed. The energization of the feed motor by the difference between the open-circuit potential across the electrodes and the initial potential of generator 78 causes rotation in the direction to feed electrode 5 toward the work. When electrode 5 makes contact with the work, the contactor 27 is energized and opens its contacts thus introducing resistor 82 into circuit. This decreases the excitation of the generator 78 and reduces the potential generated by it from its initial value to a value suitable for regulating the feed of the electrode while welding. When the electrode 5 makes contact with the work, as just mentioned, the feed motor 8 is energized by the generator 78 only, the circuit being completed directly from the motor 8 through a conductor 87, the switches 86 and 85, the contactor 27 (which is of negligible resistance), the conductor 88, the brush 17, the electrode 5, the work 1, thence to the main 13 to one terminal of the generator 78, and from the motor 8 through the conductor 89 to the opposite terminal of the generator 78. This reverses the polarity of the current through the armature of the feed motor 8, which consequently will reverse its rotation and will back the electrode away from the work. After the welding arc has thus been struck, the potential drop across the welding arc will become greater than the diminished value of potential now generated by generator 78, as described above. The motor armature 8 consequently will again reverse its rotation to the original direction and feed the electrode 5 forward at a rate depending on the difference between the potential drop across the arc and the potential generated by the generator 78. The potential of the generator 78 with the resistance 82 in circuit with the field winding 80 is so chosen that the forward feed of the electrode to maintain an arc and supply welding metal takes place at a rate which maintains the arc at the predetermined potential.

In the sequence of operations specifically described in the foregoing, commencing with the electrodes out of contact, when the contactor 27 is energized and introduces resistor 82 into circuit as described, the potential generated by the generator 78 cannot instantly diminish to the pre-adjusted magnitude. In some instances this characteristic may be advantageous, since it will provide that the potential applied to feed motor 8 for reversing it to back electrode 5 away will be momentarily greater than the diminished value provided for the purpose of regulation. Thus the feed motor will quickly cause a slight separation of the electrodes but the decrease of the potential of the generator 78 to the pre-adjusted value will prevent an excessive separation of the electrodes. Those skilled in the design of dynamo-electric machinery will be able to vary as preferred the interval required for the potential of generator 78 to diminish from the initial to the subsequent value.

The welding system shown in Fig. 5 includes elements fundamentally similar to those already described in connection with Fig. 3, together with additional improvements and refinements including an electric motor for causing relatively traversing motion between the electrode and the arc and control switches for convenience and economy of time. The system shown in Fig. 5 is also provided with circuit connections and switches for (a) energizing the traversing motor 60 to move the electrode and work with respect to each other without striking the welding arc, (b) to separately energize the feed motor in forward and reverse motion without welding for the purpose of conveniently and expeditiously inserting a new welding electrode, removing a welding electrode, or for other reasons.

When it is desired to utilize the traversing motor 60 to move the work without striking a welding arc, the single pole switch 90 is moved to the left and the double pole switch 91 is moved to the left or right, according to the desired direction of relative movement for the work 1 with respect to the electrode 5. For example, when the switch 91 is moved to the right and the switch 90 is moved to the left or "shift" position a circuit is completed from the main 12, conductors 92, 93, 94, 95, the armature of the motor 60 and the conductors 96, 97, to the main 13. When the switch 91 is moved to the left the circuit through the armature of motor 60 is in the reverse direction from the conductor 94 to the conductors 96, 95, 97, to the main 13.

To operate the feed rollers in the forward or feeding direction without the possibility of striking an arc, the switch 90 is placed in its midway position as shown in the drawing, and a switch 98 is moved to the left thereby energizing the motor 8 from the mains 12, 13, the circuit for the motor being from the positive main 13 through the resistors 106, 105, 104, conductors 103, 102, entering the motor at brush 22, emerging at brush 19, thence through conductor 101, switch 98, the conductors 100, 99, the welding resistor 31, to the negative main 12. To operate the feed rollers in the reverse or backing out direction the switch 98 is moved to the right, thereby connecting the motor armature across the section 104ª of the resistance 104, the circuit for the motor starting at the intermediate connection on resistor 104, passing through the conductor 110, the switch 98, the conductor 101, entering the motor armature at brush 19, emerging at brush 22, thence through conductors 102, 103, to the junction of resistors 104 and 109.

The resistors and welding electrodes in this figure are connected in most respects similarly to the arrangement of Fig. 3 across the constant potential mains 12, 13, the points 36 and 37 being numbered to correspond with the points 36 and 37 in Fig. 3.

In order to weld, the switch 90 is moved to the right or welding position and the switch 98 is moved to the left or feeding position. The feed motor 8 is energized, as above described, to feed the electrode 5 downward into contact with the work 1, the welding circuit remaining open until closed automatically by the operation of the contactor magnet 111. The contactor 111 is provided with an operating coil having a winding consisting of two equal opposing sections $111_a$ and $111_b$ connected in series between the mains 12—13, through the conductors 107, 112 and 121. When the switch 90 is open the same current flows through both sections of the winding of the contactor coil, the magnetic effects of which, therefore, neutralize each other and leave the armature of the contactor unaffected. When the switch 90 is placed in the welding position and the feed motor 8 has caused the electrode 5 to come into contact with the work 1, the upper section $111_a$ of the contactor coil is energized by the entire potential of mains 12, 13, the circuit being from main 13, through conductor $99_b$, the work 1, the electrode 5, the brush 17, the conductors $99_a$, 130, the switch 90, the conductor 98', coil section $111_a$, and by the conductors 112, 107, to the negative main 12. The lower section $111_b$ is short-circuited through the conductors 98', switch 90, the conductors 130, $99_a$, the electrodes 5 and 1, the conductor $99_b$, the main 13, and the conductor 121. The contactor 111, therefore, pulls down its armature and its contact 115 closes the welding circuit immediately after the contact is made between the electrodes 1 and 5.

While welding, the lower section of the coil, viz: $111_b$ is connected across the arc, which may be assumed to operate at a potential of about 15 volts and the upper section of the coil, viz: $111_a$ is connected to receive the difference between the arc potential and the potential of the mains 12—13. Since the potential of the supply mains will usually be 60 volts or more, the upper section of the coil will thus be energized during welding by 45 volts or more. The contactor is so designed that having been closed it will remain so on a relatively small unbalance of the two sections of the winding, hence will remain closed under the welding conditions just described.

During the brief interval between the instant the electrode 5 makes electrical contact with the work and the closure of the welding circuit by the contactor 111, current continues to pass through the feed motor 8 in a direction to cause it to exert a rotative effect to continue feeding the electrode 5 toward the work, the rollers 7 being set to slip over the electrode 5 under these conditions.

In connection with Figs. 2 and 3, the desirability of protecting the motor 8 from too high potential at the beginning of the operation has been explained and the contactor 27 has been shown for short-circuiting a section of a resistor when the electrodes come into contact. A like provision is made in Fig. 4 by means of resistor 82 and the contactor 27. In Fig. 5 a like effect is conveniently provided by the contact 116 also mounted on the stem of the contactor magnet 111, which short-circuits the resistor 104 through the conductors 117, 118, thereby in effect connecting the point 36 to the point 36'.

The object of connecting the welding electrodes to the source of welding current after contact has been made between them, and not before, is to avoid the possibility that welding current striking across the gap, just before contact is made, especially when a high welding current is used, may occasionally weld the electrodes together sufficiently to prevent the feed motor properly separating the electrodes to strike the arc. The end of the electrode and the surface of the work are usually not both flat and smooth over the area of the electrode, but on the contrary present one or more small points or projections. When the circuit for the welding current is completed at the electrodes the rush of current brings such points or projections almost instantly to a welding temperature so that when the electrodes are forced together a kind of butt weld is apt to be made which makes it difficult to wrench the electrode loose again when the direction of operation of the feeding mechanism is reversed. In accordance with my invention, this difficulty is avoided since the electrode is forced into firm contact with the work before the welding current is applied.

When the contact 115 closes the welding circuit an electrical condition prevails analogous to that already described in connection with Figs. 1 to 3, inclusive, when the welding operation is either started with the electrodes 5 and 1 in contact, or when the electrodes 5 and 1 have been brought into contact by the feed motor. The motor 8 is energized in the reverse direction by a current having a potential equal to the drop across the resistances 105 and 106. The motor 8 hence backs the electrode 5 away from the work and strikes the arc. As the arc potential increases, the contactor magnet 119 is energized, the winding of this magnet being connected across the welding arc by the conductors 99$_a$, 130, 131, the contact 120, and the conductor 121 in series with a resistor 122. This contactor 119 is typically set to pick up when the arc potential is about 13 volts.

The pick-up of the contact 123 of the contactor 119 has two functions: (1) The switch 91 being previously closed, for example, to the right, it closes a circuit through the travel motor to move the work with respect to the welding electrodes, the circuit being from the positive main 13 through the conductor 97, one blade of the switch 91, the conductor 96, the motor armature, the conductor 95, the other blade of the switch 91, the conductor 94, the upper contact 124 of the magnet 119, conductors 129, 125, 107, to the negative main 12. (2) It inserts the resistor 108 in series with the resistor 109 in one leg of the bridge, this resistor 108 initially being short-circuited through the lower contacts 119 by the conductors 125, 126. A reason for the use of this additional resistor 108 is as follows:

In the system, as shown in Fig. 3, with some adjustments of the resistor 44 convenient for regulation for certain classes of work, the feed motor 8 backs the electrode 5 away from contact with the work slowly enough so that occasionally the first metal fused from the electrode 5 bridges the arc gap being formed before a normal separation is attained, and by chilling, welds the electrode 5 to the work. In the system shown in Fig. 5 this contingency is prevented by providing for an initially greater reverse speed of the feed motor 8 than is provided by the system shown in Fig. 3. As the resistor 108 is short-circuited until after normal arc potential has been attained sufficient current flows through the resistors 109, 105 and 106, to balance the resistance bridge at, say, 20 volts. This will cause the motor 8 to back away faster, thereby preventing the bridging and consequent chilling of the first metal fused from the electrode. After the arc is struck and the arc potential rises sufficiently to pick up the contactor 119, the resistor 108 is thereby introduced into circuit and reduces the current through the resistors 105, 106, to a magnitude which will establish regulation at a desired operating arc potential.

It will be observed that during the phase of operation during which the electrodes are out of engagement and the arc unestablished, the current for operating the motor in a direction to feed the electrode toward the work flows through resistances 106, 105 and 104 in series and thence through a divided circuit one branch of which includes the resistance 109 and the other branch of which includes the motor armature and the resistance 31 in series. The drop in the low resistance 31 is of negligible value for the relatively small motor current so that the resistance 109 produces the same effect as if it were directly in shunt to the motor armature instead of in shunt through the resistance 31. This connection whereby the motor is fed through a series resistance and has a resistance in shunt therewith produces a slow and steady speed of operation as is well known in the art of electric motor control. This is of importance since it avoids violently jamming the electrode against the work. It will also be observed that while the electrode is in contact with the work the current, which operates the motor in the reverse direction, flows through the same kind of circuit, the resistance 109 being then the resistance in series with the divided circuit, one branch of which comprises the resistances 106 and 105, the other branch comprising the motor armature. The branch comprising the resistances 106 and 105 is connected in shunt with the motor armature as long as the electrodes are in engagement. A strong steady pull is therefore exerted by the motor to separate the electrode from the work to strike the arc.

When the kind and diameter of fusible electrode and the welding current have been selected for a specific welding operation, the rate of consumption of the electrode is substantially determined thereby, and is substantially independent of the arc potential within the limits of arc potential suitable for welding. Using a specific feed motor and specific roller diameter and gear reductions, the selected conditions of operation therefore substantially fix the average potential at which the feed motor operates in establishing an equilibrium between the rate of feed and rate of consumption of electrode. In the various embodiments of my invention means is provided for varying the average potential operating the feed motor by varying the fixed potential which is differentially connected to the arc potential. In Figs. 1, 2, 3 and 5, the fixed potential is equal to the potential drop across a resistor which is shown as adjustable. In Fig. 4 the resistor 82 used for varying the potential generated by armature 78 is shown as adjustable.

Referring now specifically to Fig. 5, it will be observed that the resistor 106 may be adjusted by means of a pivoted switch arm 127. For any given adjustment of welding current the arc potential may be increased by turning this pivoted arm to the right, which increases the potential fixed across resistor 106, and conversely.

A change in the welding current, which may be effected in Fig. 5 by an adjustment of resistance 31 requires a change in the rate of electrode feed. By means of the resistor 106 considerably different rates of feed of electrode may be employed without substituting a different motor for motor 8, or changing the gear reduction. That is to say, after the welding current adjustment is changed so as to require a greater or less rate of feed of the electrode to maintain the arc, the proper speed of motor 8 for this condition may be obtained by an adjustment of resistance 106. If the welding current were changed materially without an adjustment of resistance 106, the arc length would be changed by the amount necessary to cause to be impressed upon the armature of the feed motor the changed voltage necessary to maintain the new rate of feed. The adjustment of resistance 106 enables the new voltage to be impressed upon the motor while leaving the arc length unchanged. A change in the size of electrode will also ordinarily require a change in the rate of feed. For example, a feed motor and mechanism may be so designed that the resistance drop in the motor averages 1 volt when regulating the arc. The gear reduction may be so selected that for a specific set of welding conditions consuming ⅛ inch diameter round electrode at the rate of 15 inches per minute, an average counter-electromotive force of 4 volts will be required of the feed motor and an average of 5 volts will be impressed on the feed motor. An arc potential averaging 15 volts may be therefore obtained by adjusting resistor 106 so that the potential drop across 105, 106, will be 10 volts. If it is then desired to weld with ¼ inch diameter round electrode under conditions which consume the electrode at the rate of 7½ inches per minute, the average counter E. M. F. required of the feed motor will be one-half the above value, or 2 volts, and the potential impressed on the feed motor 3 volts. To maintain an arc potential averaging 15 volts will now require an adjustment of resistor 106 so that the potential drop across it will be 12 volts.

While welding, if the arc should be interrupted for any reason, the contactor magnet 111 will permit contact 115 to fly open, since the magnetization of the core tends to pass through zero, coil 111$_a$ being shunted by resistor 31 as long as contact 115 is closed. The motor 8 then operates to feed the electrode 1 toward the work to re-strike the arc in the manner heretofore set forth. If the arc encounters an irregularity sufficiently great to short-circuit it, the contactor 119, which is energized by the arc potential, drops out. This cuts off current from traversing motor 60. When the arc is thus short-circuited electrical circuit relations are reestablished substantially the same as when contactor 111 closes on initial contact of the electrodes. The feed motor under these circumstances ordinarily re-strikes the arc in accordance with the principles explained hereinbefore whereby the arc is struck initially. Whenever, however, chilling occurs so quickly that the electrode 5 cannot free itself from the crater in the work, a resistor 128, shown connected permanently across the brushes of motor 60, by dynamic braking quickly retards motor 60 to rest. By this means, if the electrode becomes short-circuited on the work and fails to free itself, the automatic stopping of the traverse motion prevents undue distortion of the electrode or straining of the welding machine. Similarly, when the arc is interrupted the opening of contact 120 which opens with contact 115 drops contactor 119 and stops the traversing motor.

What I claim as new and desire to secure by Letters Patent of the United States, is:

1. The method of operating a welding arc between a fusible electrode and a cooperating electrode which consists in causing the welding electrodes to approach and recede from each other in accordance with the difference between the arc potential, and a substantially fixed potential which is less than a desired arc potential.

2. The method of regulating a welding arc between a metal-depositing electrode and work to be welded which consists in approaching and separating the electrodes in accordance with the direction of the departure of the arc potential above or below a predetermined potential which is less than the desired arc potential, and varying the rate of movement corresponding substantially to the magnitude of said departure.

3. The method of electric welding with a fusible electrode which consists in feeding said fusible electrode into contact with a cooperating electrode, striking an arc by withdrawing said electrode from the work in accordance with the difference between the potential drop across said electrodes and a substantially fixed potential, while the potential between said electrodes is less than the predetermined substantially fixed potential value, continuing to withdraw the electrode from the work, and finally feeding said electrode toward the work when the potential drop in the arc becomes greater than said fixed value at a rate adapted to maintain said welding arc and to supply welding material to the work.

4. An electric arc welding apparatus comprising means for feeding a fusible welding electrode to the work at a rate depending upon variations in a function of the energy at the arc characterized by the fact that the operation of said feeding means is controlled by the resultant effect of the arc potential and an independent source of potential.

5. An arc welding apparatus comprising a source of electric welding current, arc welding electrodes connected thereto, means for automatically feeding one of said electrodes and means for varying the direction and the rate of feed of said electrode in response to the polarity and magnitude of unbalance between the potential across the arc, and a substantially fixed potential which is less than the desired arc potential.

6. An arc welding apparatus comprising a source of electric welding current, arc welding electrodes connected thereto, a motor for automatically moving an electrode into and out of engagement with another and means for varying the direction and rate of feed of said electrodes in response to the polarity and magnitude of a resultant potential derived from the potential drop across the arc, and a fixed potential value of opposite polarity differing from the desired arc potential sufficiently to develop torque in the feed motor sufficient to move the electrode.

7. An automatic arc welding machine comprising a feed device for an electrode, an electric motor for operating said feed device, and means for controlling the direction of rotation and speed of said motor in accordance with the difference between the potential across the arc and a substantially fixed potential which is less than the desired arc potential.

8. An electric arc welding apparatus comprising cooperating electrodes, one of which is adapted to be progressively fused by the heat of an arc, an electric motor for automatically feeding said fusible electrode, means for energizing said motor by a current, the potential and polarity of which is determined by the difference between the potential drop between said electrodes and a substantially fixed opposing potential, and feeding mechanism connected between said motor and said fusible electrode operating to approach said electrodes when said potential drop is greater than said opposing potential and to separate said electrodes when the potential drop at the welding electrodes is smaller than said opposing voltage.

9. An electric arc welding apparatus comprising cooperating arc welding electrodes, a source of electric welding current connected thereto, a source of substantially constant potential connected in a differential relation to the potential between said electrodes, feed means for one of said electrodes, an electric motor for driving said feed means, connected to be energized by current having a potential equal to the preponderance of one of said differentially related potentials over the opposed potential, and being rotatively connected to move said electrode in a direction tending to reduce the difference between said potentials.

10. An arc welding apparatus comprising a source of current of substantially constant potential, a welding electrode connected to a terminal of said source, a cooperating electrode, current modifying means connected between the cooperating electrode and the opposite terminal of said source for producing a potential of suitable characteristic for welding, a resistor connected across the terminals of said constant potential source, an electric motor having one of its terminals connected to the cooperating electrode and the opposite terminal connected to a point on said resistor the potential difference of this point from the first-mentioned electrode being less than the potential difference intended to be maintained across the welding arc.

11. An electric arc welding apparatus comprising cooperating welding electrodes, a source of current of substantially constant potential, means connected between said source and one of said electrodes for modifying the characteristic of current from said source for welding purposes, a plurality of resistances connected in series to said source and disposed with respect to said modifying means and welding electrodes in the form of a Wheatstone bridge, a motor connected across said bridge, said resistances being unbalanced when the arc potential is normal, and connected to increase the unbalance when the arc potential increases and both decrease and reverse the unbalance when the arc potential decreases, and feeding mechanism between said motor and one of said welding electrodes.

12. An electric arc welding system comprising a source of current of substantially constant potential, a resistor connected across said source, means for obtaining a current having a characteristic suitable for welding, welding electrodes connected to said welding source, an electrical connection between one of said electrodes and a point of said resistor, an electric motor connected between the cooperating welding electrode and another point on said resistor, the potential drop between said points on said resistor having a differential relation to the potential drop between said welding electrodes and being less than the desired welding arc potential, feeding mechanism connected mechanically between said motor and one of said electrodes operating to approach said electrodes when the potential drop between said welding electrodes is greater than said opposing potential and to separate said electrodes when the potential drop between said welding electrodes is less than said opposing potential, and automatic means for decreasing the resistance of said resistor between said points of connection after a welding arc has been struck between said electrodes.

13. An automatic arc welding machine comprising a feed device for an electrode, an electric motor for operating said feed device, means for controlling the direction of rotation and speed of said motor in accordance with the difference between the potential across the arc and an independent source of potential and means for varying the effect of said independent source in accordance with the electrical condition of the welding arc.

14. An electric arc welding apparatus comprising means for moving a welding electrode toward and away from the work, a reversible electric motor having a relatively low stored energy and low armature and brush resistance drop in its normally operating condition for driving said moving means, and means operating to reversibly control said motor to strike an arc and to feed said welding electrode to maintain said arc.

15. An electric arc welding apparatus comprising means for moving a welding electrode toward and away from the work, a reversible electric motor for driving said means, and electrical control means for said motor operating to strike an arc between said welding electrode and the work, to reverse said motor and to feed said welding electrode to maintain said arc.

16. An electric arc welding apparatus comprising means for holding cooperating welding electrodes, a motor for regulating the arcing relation of said electrodes and a single feeding mechanism for moving one of said electrodes by said motor, said motor being reversibly responsive to momentary fluctuations of arc potential to respectively approach and separate said electrodes, strike and tend to maintain an arc having a predetermined potential.

17. An apparatus for electric arc welding comprising electrode feeding devices, a motor adapted to operate said feeding devices to feed an electrode toward and away from the work to draw the welding arc between the work and the electrode and means for controlling the arc drawing operation of said motor in accordance with the potential across the welding electrodes.

18. An apparatus for electric arc welding comprising electrode feeding devices, a reversible electric motor arranged to operate said feeding devices to move the electrode toward and away from the work to draw the welding arc between the work and the electrode and means for controlling the arc drawing operation of said motor in accordance with the electrical condition of the welding arc.

19. An apparatus for electric arc welding comprising electrode feeding devices, a reversible electric motor arranged to operate said feeding devices to move the electrode toward and away from the work to draw the welding arc between the work and the electrode and means arranged to control the direction of current flow through the motor armature in accordance with the electrical condition of the welding arc.

20. An electric arc welding apparatus comprising a welding head for holding a welding electrode into arcing relation with the work, means for producing relative transverse displacement of said welding head and work, a reversible electric motor for feeding a welding electrode independently of the relative motion of said welding head and work, and electro-responsive means for controlling said motor in forward and reverse movement independently of the displacement of said welding head and work to cause a welding electrode to strike an electric arc with the work and to feed said electrode to maintain said arc.

21. An electric arc welding system comprising a source of welding current, welding electrodes connected to be supplied by said source, a source of substantially constant potential, a resistor connected across said constant potential source, an electrical connection between one of said electrodes and a terminal of said constant potential source, and an electric motor connected between the cooperating electrodes and a point of said resistor, the potential drop between said points of connection on said resistor opposing the potential drop between said electrodes and being less than the desired welding arc potential, said motor being rotatively connected to cause said electrodes to approach when the potential drop between said welding electrodes is greater than said opposing potential, and to separate when the potential drop between said welding electrodes is less than said opposing potential.

22. An electric arc welding apparatus comprising a mechanism for feeding a fusible welding electrode toward and away from the work, a reversible electric motor geared directly to said feed mechanism and an electrical control for said motor responsive to fluctuations of a welding arc between said fusible electrode and the work to vary the direction and rate of feed of said electrode to maintain said arc at a predetermined potential.

23. The method of striking a welding arc which consists in causing welding electrodes to come into contact while unenergized with electric welding current, impressing welding current upon said electrodes while in contact and thereafter separating said electrodes to strike an arc.

24. The method of striking a welding arc which consists in causing a fusible welding electrode to come into contact with the work while unenergized with welding current, impressing a welding current upon said electrode and work while the same are in contact and thereafter separating said electrode from the work to strike an arc.

25. An automatic arc welding machine comprising a feed device for an electrode, an electric motor for operating said feed device, means for controlling the direction of rotation and speed of said motor to draw and thereafter regulate the welding arc in accordance with the difference between the potential across the arc and an independent source of potential, and means whereby the voltage of the welding circuit is applied to the electrodes only after the electrode are brought into engagement during the arc striking operation.

26. An electric arc welding apparatus comprising a welding electrode movable into and out of engagement with the work, a welding circuit connected to said electrode and work, a contactor in said circuit arranged to prevent current flow in said welding circuit when said contactor is unenergized, and circuit connections for energizing said contactor when said welding electrode and work have come into contact thereby permitting the flow of welding current, and means for separating said electrode and work to strike an arc.

27. An automatic arc welding machine comprising a feed device for moving cooperating welding electrodes into and out of contact, a circuit for supplying welding power, a contactor having opposing windings connected to neutralize each other while the welding electrodes are out of contact, and operative to open said welding circuit when said windings neutralize each other, connections for deenergizing one of said coils when said welding electrodes come into contact thereby closing said welding power circuit, and motor means operative to separate said electrodes to strike an arc after said welding circuit has been closed.

28. An automatic arc welding apparatus comprising means for causing welding electrodes to move relatively to each other to strike and maintain a welding arc at a predetermined potential, means for traversing one of said electrodes relative to the other and means for energizing said traversing means when a welding arc between said electrodes has attained a predetermined potential.

29. An automatic arc welding apparatus comprising a reversible electric motor for causing welding electrodes to strike and maintain an arc between said electrodes, a motor for causing relative traversing motion between said electrodes, means for energizing said traversing motor when said welding arc has attained a predetermined potential, and means for stopping said traversing motor when said arc becomes short circuited.

30. An automatic arc welding apparatus comprising automatic means for maintaining a welding arc between a fusible electrode and the work, an electric motor for causing relative traverse between said electrode and the work, and means for stopping said traversing motor by dynamic braking when the welding arc becomes short-circuited.

31. An electric arc welding system comprising means for feeding a fusible welding electrode to the work at a rate depending upon variations in a function of the energy at the arc, and comprising independently operating means for producing a relative motion of traverse between the work and the electrode, characterized by the fact that the operation of the traversing means is controlled in accordance with the electrical condition of the welding arc.

32. An electric arc welding system wherein a fusible electrode is fed to the work and wherein means are provided for producing a relative motion of traverse between the work and the electrode characterized by the fact that means, including a device responsive to arc voltage, are provided for stopping the motion of traverse whenever the arc fails, whether by reason of open circuit or short circuit.

33. An electric arc welding system comprising an electrode between which and the work an arc is adapted to play, means for producing a relative motion of traverse of the electrode with respect to the work, means responsive to the arc voltage for controlling the operation of the traversing means, and means arranged to affect the operation of said voltage responsive means when the arc is interrupted.

34. An automatic welding machine comprising a device for feeding a welding electrode into arcing relation with the work, a circuit for applying welding power to said electrode and work, and means for connecting said circuit to said electrodes after the welding electrode comes into contact with the work and continuing said connection while a welding arc is operating, and means for traversing said electrodes with respect to each other along a seam to be welded.

35. An arc welding system wherein means are provided for automatically striking the welding arc and wherein means are provided for producing a relative motion of traverse of the arc along the work, characterized by the fact that means responsive to the condition of the arc are provided for controlling the traversing means to start the traversing movement when the arc has been established.

36. An apparatus for electric arc welding comprising a reversible electric motor and means operated thereby for feeding a welding electrode toward and away from the work to draw the welding arc between the work and the electrode, means for controlling the direction of current flow through the motor armature in accordance with the electrical condition of the arc arranged, when the electrode is out of contact with the work and the arc is unestablished, to supply operating current to the motor in a direction to feed the electrode toward the work said means during this phase of operation comprising a resistance in shunt to the motor armature and a resistance in series with the divided circuit comprising the motor armature and shunt resistance.

37. An apparatus for electric arc welding comprising a reversible electric motor and means operated thereby for feeding a welding electrode toward and away from the work to draw the welding arc, means for controlling the direction of operation of said motor in accordance with the electrical condition of the arc comprising resistances arranged so that while the electrode is out of contact with the work and the arc is unestablished a circuit is completed comprising a resistance in shunt to the motor armature and a resistance in series with the divided circuit comprising the motor armature and shunt resistance through which current flows in a direction to feed the electrode toward the work and arranged so that, while the electrode is in contact with the work, a circuit comprising a resistance in shunt to the motor armature and a resistance in series with the divided circuit comprising the motor armature and shunt resistance is completed for operating the motor in a direction to withdraw the electrode from the work to strike the arc.

In witness whereof, I have hereunto set my hand this 14th day of February, 1919.

MAX A. WHITING.